(No Model.) 4 Sheets—Sheet 3.

J. P. MASON.
MACHINE FOR MAKING WASHERS.

No. 276,848. Patented May 1, 1883.

Witnesses
Thomas J. Bewley.
Joseph P. Ingram.

Inventor
James P. Mason.
per Stephen Ustick. Att'

(No Model.)  4 Sheets—Sheet 4.
J. P. MASON.
MACHINE FOR MAKING WASHERS.
No. 276,848.  Patented May 1, 1883.
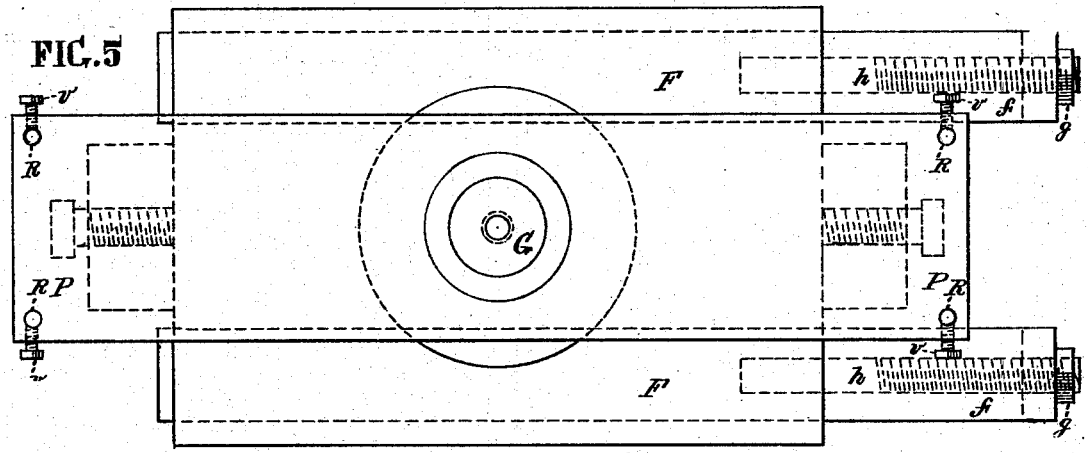
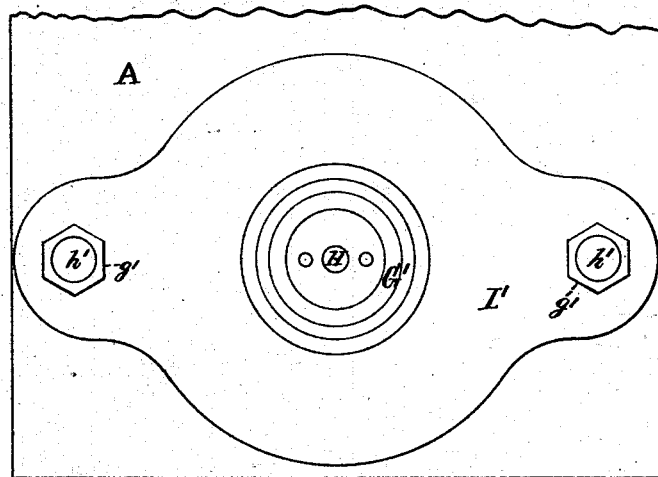
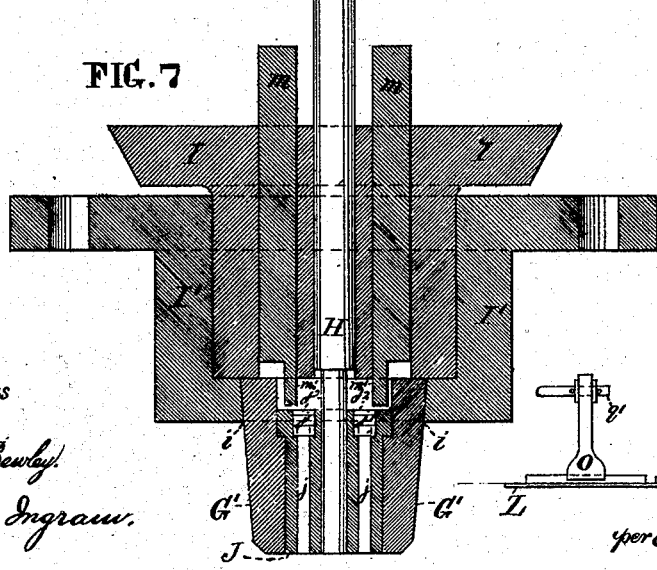
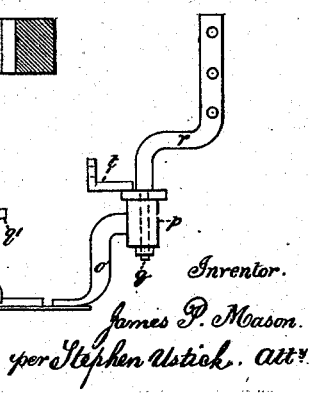
Witnesses
Thomas J. Bewley
Joseph P. Ingram
Inventor
James P. Mason
per Stephen Ustick, Atty.
N. PETERS, Photo-Lithographer, Washington, D. C.

UNITED STATES PATENT OFFICE.

JAMES P. MASON, OF PHILADELPHIA, PENNSYLVANIA, ASSIGNOR OF ONE HALF TO FREDERICK T. WEED, OF SAME PLACE.

MACHINE FOR MAKING WASHERS.

SPECIFICATION forming part of Letters Patent No. 276,848, dated May 1, 1883.

Application filed May 19, 1882. (No model.)

*To all whom it may concern:*

Be it known that I, JAMES P. MASON, a citizen of the United States, residing at Philadelphia, in the county of Philadelphia and State of Pennsylvania, have invented a new and useful Improvement in Machines for Making Washers, of which the following is a specification.

The object of my invention is a machine so constructed as to form the washers at one operation by the simultaneous action of the dies and piercing-punch, whereby to avoid more than one handling of the sheet metal out of which the washers are made, and thereby accomplishing the manufacture of the washers in much less time than is ordinarily done by operating the piercing-punch and dies separately; hence the machine can be constructed at a reduced cost, in addition to the advantage obtained by its facility of operation, which much reduces the cost of the washers.

The nature of the invention is so fully set forth in the body of the specification and claims as to avoid the necessity of a particular description in this place.

Figure 1:
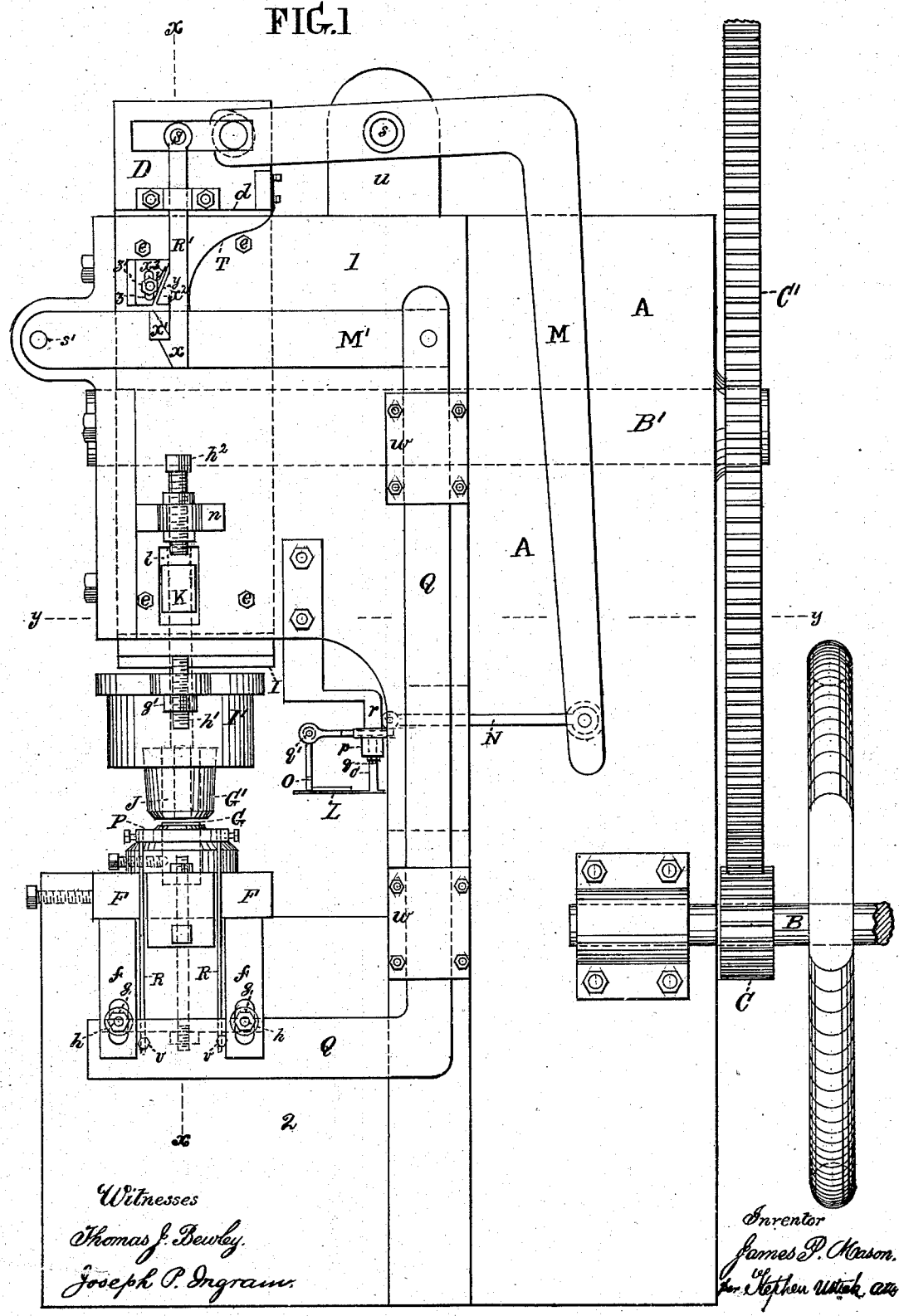
Figure 2:
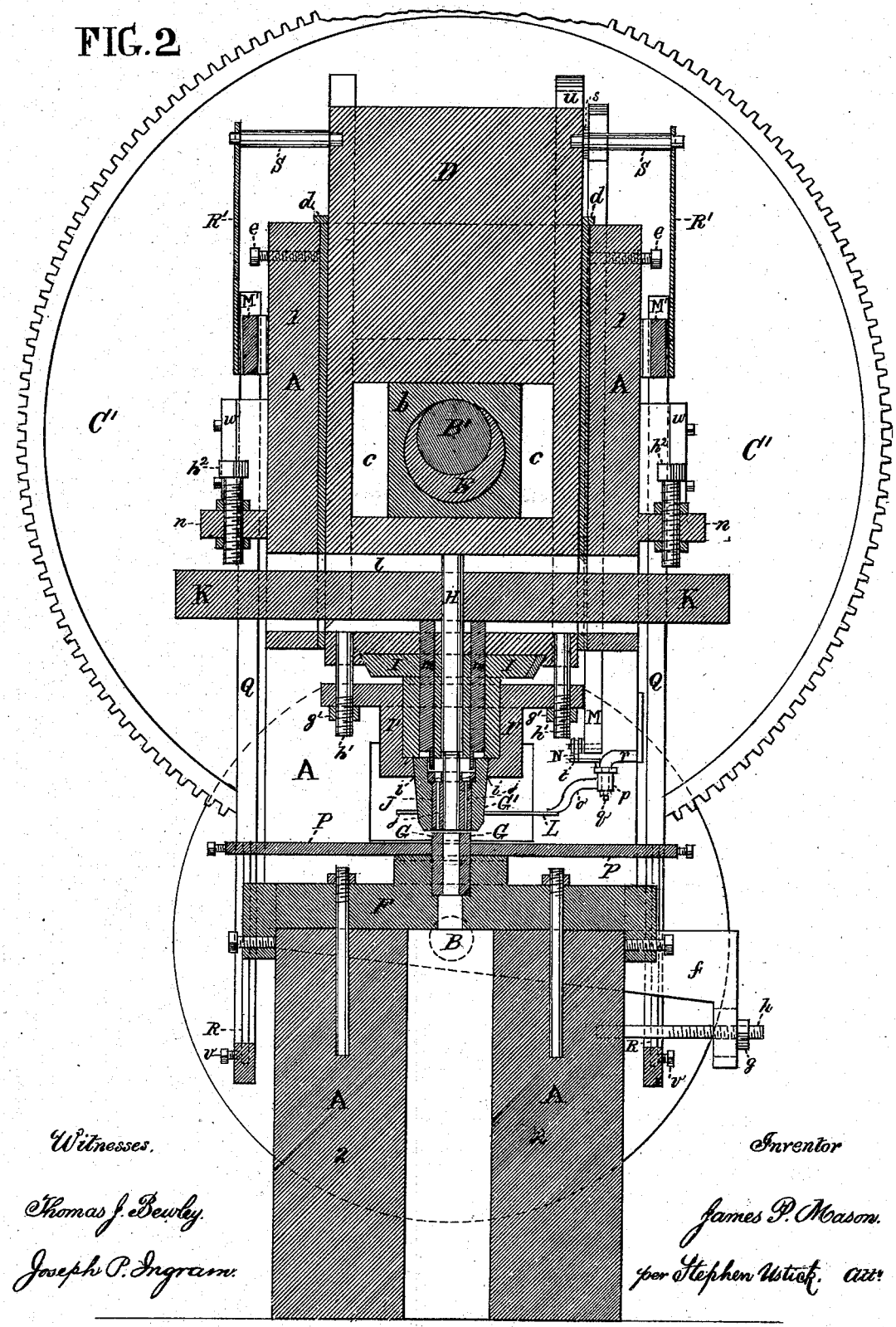
Figure 3:
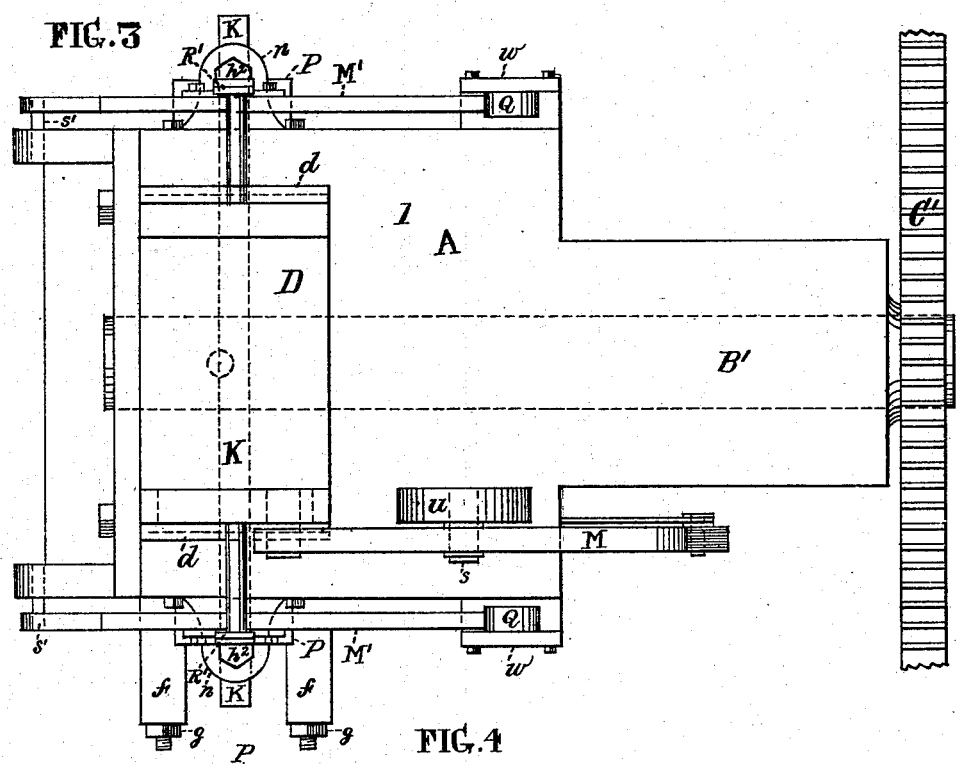
Figure 4:
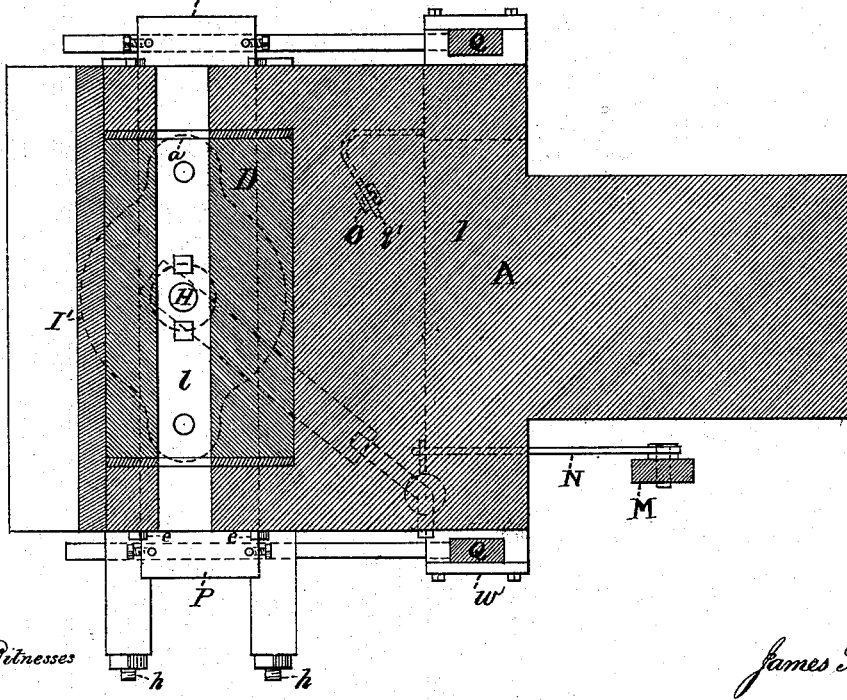

In the accompanying drawings, which make a part of this specification, Figure 1 is a side elevation of my improved machine. Fig. 2, Sheet No. 2, is a section through the central vertical plane of the piercing-punch and dies, and through the parts of the machine with which they are immediately connected, at the broken line *x x* of Fig. 1. Fig. 3, Sheet No. 3, is a plan view of the machine. Fig. 4 is a horizontal section at the broken line *y y* of Fig. 1. Fig. 5, Sheet No. 4, is a top view, on an enlarged scale, of the stripper-plate P and a portion of the housing A. Fig. 6 is a bottom view of the sleeve J, part I' of the die-chuck, and a portion of the frame. Fig. 7 is a vertical section of the chuck, upper die, G', piercing-punch H, and sleeve J. Fig. 8 is a front elevation of the carrier L; Fig. 9, a side elevation of one of the pins *j* and a rubber cushion, *j'*, in connection with a screw-plug, $j^2$.

Like letters of reference in all the figures indicate the same parts.

A represents the frame with which the several parts of the machine are connected.

B is the driving-shaft, provided with the pinion C, which gears into the toothed wheel C' on the shaft B'.

D is a sliding head in the recess *a* of the upper projection, 1, of the frame. A reciprocating movement is given to the head by means of the eccentric E on the front end of the shaft B' for imparting the various movements to the other moving parts of the machine. The eccentric revolves in the block *b*, which is situated in the horizontal slot *c* of the head D, the slot being of sufficient width to admit of the free lateral movements of the block caused by the action of the eccentric in the revolutions of the shaft B'. There are gibs *d d*, held against parallel edges of the head D by means of set-screws *e*, for taking up the wear of the head. F is a bed-plate, which rests upon the lower projection, 2, of the frame. It is adapted to have a vertical adjustment by means of the wedge-shaped slides *f f* in cross-grooves of the lower projection, 2, of the frame, the slides being adjusted by means of the nuts *g g* on the screw-bolts *h h*, which project from one side of the frame A, whereby a vertical adjustment is given to the lower die, G, which, together with the upper die, G', forms the circumferential edge of the washers. The said die G is connected with the bed-plate, as seen in Fig. 2. The punch H and upper die, G', are connected with the chuck, which consists of the parts I and I'. The part I has a dovetail connection with the lower side of the sliding head D, as shown in Fig. 2, and the part I' is held in connection with the part I by means of the screw-bolts *h' h'*, which are provided with nuts *g' g'*, the upper ends of the bolts being permanently secured in the lower side of the sliding head D. The upper die, G', is fitted to the conical opening *i* of the part I' of the chuck. The chuck is made in two pieces, as described, for convenience in connecting and arranging the pins *m m* and *j j*, and also the sleeve J, without disconnecting the upper part, I, from the sliding head D, the lower part, I', being readily and expeditiously removed from the upper part, I; and it would be altogether impracticable to manipulate the pins *j j* for the purpose of regulating them, or for repairs, without having the chuck in two pieces, as their heads come in vertical range with the hub of the lower chuck, I′, as seen in Fig. 2, and consequently said chuck has to be removed far enough from the upper die to admit of inserting them in the sleeve J.

J is a sleeve, which has a central hole which fits the lower end of the punch H. Its lower part is of the same diameter as the inner diameter of the upper die, G′, in which it is situated; but the upper end is enlarged, and fits the enlarged upper end of the die, having its shoulder formed by its enlargement to rest on the shoulder of the die-opening. The sleeve is provided with vertical pins $j\ j$ in corresponding openings, in which they are adapted to slide, the use of the pins being to discharge the newly-formed washer from the lower end of the sleeve, they having enlarged heads, on which are seated rubber cushions $j'\ j'$, which, by compression in the upward movement of the sliding head, as hereinafter described, are caused to exert the requisite force for that purpose as they bear against the screw-plugs $j^2\ j^2$.

K is a horizontal bar for knocking out the washer from the upper die, G′. It is situated in the slot $l$, which extends through the upper projection, 1, of the housing A and the sliding head D, as seen in Figs. 1 and 2. The upward movement of the bar is regulated by the set-screws $h^2\ h^2$, which are held in the lugs $n\ n$ of the housing, and is seated on the upper ends of the pins $m\ m$, which have a vertical movement in the chuck I. The lower ends of the pins are reduced in thickness, as represented, to form extensions $m'\ m'$, which pass into the enlarged opening of the die G′, to bear upon the upper end of the sleeve J. As the head D ascends, after cutting the washer out of the sheet metal, carrying the die and sleeve with it and bringing the knock-out bar up against the set-screws $h^2$, the knock-out bar and sleeve being thus arrested in their upward movement and the die G′ still moving upward, the die is pulled from the washer, which may remain sticking to the sleeve.

L is a carrier-plate for removing the washers from the dies as they are discharged therefrom, which is shown in Figs. 1 and 2 in connection with the machine, and in detail in a detached view, Fig. 8. This carrier-plate has an arm, $o$, provided with the hub $p$, which is adapted to turn on the pin $q$ of the bracket $r$, the said bracket being permanently secured to frame A.

M is a lever hung on the fulcrum-pin $s$, and connected with the arm $t$ of the hub $p$ by means of the connecting-rod N. The upper end of the lever has connection with the stud $u$, which projects from the one side of the sliding head D, and by the reciprocating movements of said head the carrier-plate L is brought under the newly-formed washer, which is discharged thereon, and carried to one side of the machine and knocked off by the tripper O, which is adapted to turn on the pin $q'$ for discharging the washer into a chute, as hereinafter described.

P is a stripper-plate (shown in detail in Fig. 5) for stripping the sheet metal out of which the washers are being formed from the lower die, G, after the withdrawal of the upper die, G′. It is connected with the horizontal parts of the yokes Q Q by means of the vertical rods R R R R, which are secured in corresponding holes in the yokes and stripper-plate by means of set-screws $v$. The yokes are adapted to slide up and down at the sides of the frame in the boxes W, as seen in Figs. 1 and 2. The upper ends of the yokes are jointed to the levers M′ M′, which are hung on the fulcrum-pins $s'$.

R′ R′ are connecting-rods hung on the horizontal studs S S, which project from opposite sides of the sliding head D, and have lugs $x\ x$, which connect with the under side of the lugs $x'\ x'$ on the outer side of the lever. Above the lugs $x\ x$ of the rods are lugs $x^2\ x^2$, which have inclined edges $y$, that bear against the reverse-inclined edges $y'$ of the lugs $x^3\ x^3$ of the frame A at the proper time, in the ascent of the sliding head D, to disengage the lugs $x\ x$ from the lugs $x'\ x'$ when the stripper-plate is elevated even with the upper side of the frame, and thus to arrest the upper movement of the stripper-plate. In the downward stroke of the sliding head D, before it reaches its lowest position, the inclined edges $y^2$ of the lugs $x\ x$ of the rods bear the rods outward from the stationary lugs $x'\ x'$ of the levers until the upper and square part of the lugs $x\ x$ comes into line with the under side of the lugs $x'\ x'$, and then by the inclination of the rods R′ R′ assume a perpendicular position, and by the action of the springs T T the lugs $x\ x$ re-engage with the lugs $x'\ x'$. I regulate the upward throw of the stripper-plate by making the lugs $x^3\ x^3$ of the housing adjustable by means of the slots $z$ and set-screws $z'$.

The operation of the machine is as follows: The sheets of metal to be made into washers being cut up into convenient size for manipulation, a piece is arranged on the upper side of the lower die, G, and as the sliding head D descends, the punch H pierces a hole of the proper size for the eye of the washer, and the upper die, G′, pressing downward, cuts the circumferential edge of the washer. As the head D ascends to its upward position the washer is pushed out of the upper die, G′, by the bearing up of the sleeve J against the lower ends of the knock-out pins $m\ m$, the upper ends of which are thus caused to bear up against the knock-off bar K, as above described. By the reciprocating movement of the sliding head D, acting through the lever M, the carrier-plate L is brought under the washer in its forward movement, as seen in Fig. 4, and in its backward movement carries it under the tripper O, which is canted as the carrier-plate strikes it, and in regaining its normal vertical position comes in front of the washer. When the carrier-plate starts again in its forward position the washer is thereby pushed off by the tripper O into a chute beneath it, (not seen in the drawings,) whence it is discharged from the machine. Sometimes the washer is inclined to stick to the under side of the sleeve J. When that is the case the action of the rubber cushions $j'j'$, by their compressed force, as above described, forces the pins $jj$ downward and discharges the washer.

I claim as my invention—

1. The combination of the chuck having parts I and I' with the upper die, G', sliding head D, and bolts $h'h'$, having nuts $g'g'$, substantially in the manner and for the purpose set forth.

2. The combination of the piercing-punch H with the parts I and I' of the chuck-die G', and the sleeve J for forming the eye of the washers, substantially as described.

3. The sleeve J, in combination with the die G', knock-out rods $mm$, and knock-out bar K for discharging the washers from the said die G', substantially as described.

4. The combination of the pins $jj$ and rubber blocks $j'j'$ with the sleeve J, having screw-plugs $j^2 j^2$ for discharging the washer from the lower end of the sleeve after it has left the die G', substantially as described, 5. The combination of the lever M, hub $p$, having an arm, $t$, and connecting-rod N, for giving a reciprocating movement to the carrier L, for bringing it under the newly-formed washer to be discharged thereon, and carrying it away from the dies, substantially as described.

6. The tripper O, in combination with the carrier L, for discharging the washers from the latter, substantially as described.

7. The combination of the yokes Q Q, rods R, sliding head D, levers M', and stripper-plate P, substantially as described, and for the purpose set forth.

JAMES P. MASON.

Witnesses:
THOMAS J. BEWLEY,
STEPHEN USTICK.